Dec. 20, 1960     N. I. BOHLIN     2,965,335

PROTECTION DEVICE FOR OCCUPANT OF AIRCRAFT EJECTION SEAT

Filed Aug. 22, 1958

Inventor
Nils I. Bohlin

United States Patent Office 2,965,335
Patented Dec. 20, 1960

2,965,335

PROTECTION DEVICE FOR OCCUPANT OF AIRCRAFT EJECTION SEAT

Nils Ivan Bohlin, Linkoping, Sweden, assignor to Svenska Aeroplan Aktiebolaget, Linkoping, Sweden, a corporation of Sweden Filed Aug. 22, 1958, Ser. No. 756,571

4 Claims. (Cl. 244—122)

This invention relates to aircraft ejection seats of the type whereby an airman may be forcefully propelled out of an aircraft in the event of an emergency which necessitates abandoning the aircraft in flight, and the invention refers more particularly to means in such a seat device for protecting the face of its occupant.

As is well known, the speed of modern high performance aircraft creates serious problems when emergency escape becomes necessary in flight; and to overcome these problems mechanical devices are employed which assist the crew to leave the aircraft in an emergency. Commonly such a device takes the form of a seat which is normally mounted in the aircraft for occupancy by a crew member, and which, upon actuation of a suitable control by the occupant, is propelled out of the airplane by the force of an exploding charge of powder or the like, carrying the occupant well clear of the aircraft. The airman is of course strapped to the seat, and is provided with a parachute which is also secured to his person.

Heretofore it has been customary to provide such ejection seats with a face shield or blind of canvas or similar material secured to the upper portion of the seat in a position to be brought down in front of the airman's face to protect the same during ejection. The shield had a handle at its bottom by which it could be drawn downwardly from an inoperative position above the airman's head to an operative position in front of his face, and by which it could be held in the operative position during ejection; and when the handle was drawn downwardly to bring the face shield into operative position this action also initiated seat ejection. The airman was expected to hold onto the handle during his subsequent expulsion from the airplane, to insure that the shield would be held in its protective position in front of his face and to insure that his arms would be in the best position to receive the accelerative shock forces incident to ejection.

However, two serious difficulties developed with past face shields of this type. First, during ejection the airman's hands and arms were pulled violently downward by the upward aceleration forces, so that he had great difficulty in maintaining his grip on the handle, and often found it impossible to do so. This problem is still more serious for such ejection seats in which acceleration forces substantially greater than 20 g. can be tolerated by the airman by reason of the provision of spine unloading harness equipment.

The second difficulty with past ejection seat face shields arose from the tendency for the high speed slip stream to tear the substantially imperforate blind away from the airman's face after ejection, particularly if he turned or tumbled so that he had his back to the relative wind. This problem was aggravated by higher aircraft speeds.

In a series of flight tests conducted at airspeeds ranging from 540 km./hr. to 968 km./hr., using a dummy as the seat occupant, and using a conventional imperforate face shield, it was found by a special device that the dummy's "grasp" of the face shield handle came loose in a majority of the ejections, even though the simulated grasping force was sufficient to resist forces up to 90 lbs. per hand. It was also found that a substantially imperforate face shield was wholly or partly torn away or broken in a majority of the ejections and that reinforcement of the face shield was of little or no value in preventing damage to it.

The seriousness of the difficulties presented by the prior tyep of face shield is apparent from the fact that the airman could be hit in the face and seriously injured by the handle on the shield if the was unable to hold onto it, and his oxygen mask might be torn from his face and his head left unsupported if the face shield was torn away or ruptured.

It is therefore an object of the present invention to provide a device for protecting the face of an occupant of an aircraft ejection seat of the character described wherein the above described two deficiencies of prior face protecting devices will be overcome.

More particularly, it is an object of the present invention to provide a net-like face screen comprising reticulations defining numerous appertures through which air may freely flow, so that wind forces upon the screen are minimized, and which screen will be effective to support an airman's head during ejection and to protect him by holding his oxygen mask and other personal equipment in position over his face.

Another specific object of this invention resides in the provision of a face screen of the character described having a downwardly yieldable actuating handle which will absorb a substantial portion of the downward force upon the seat occupant's hands and arms due to upward acceleration of the seat during ejection or to the effect of the slip stream.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates one complete example of the physical embodiment of the invention constructed according to the best mode so far devised for the practical application of the principles thereof, and in which.

Figure 2:
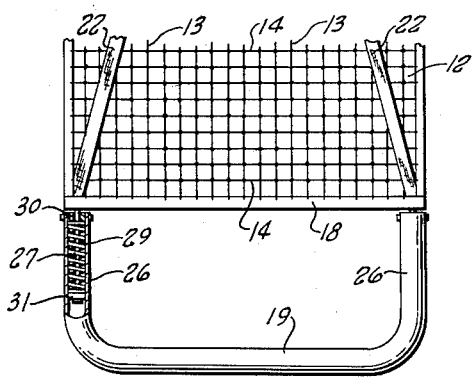
Figure 2 is a front view, partially in section, of the handle assembly of a face screen of this invention.

Referring now to the accompanying drawing, the reference numeral 5 designates generally an ejection seat of known type, intended to be mounted in an airplane to serve as a normal seat for an airman and adapted to be propelled out of the airplane, together with its occupant, for ejection escape. The seat can be accelerated out of the airplane by means of a suitable ejection gun 6, which may comprise a piston 7 fastened at its upper end to the seat and telescoped downwardly into a cylinder 8 adapted to be fastened at its lower end to a fixed part of the airplane. As is also well known, seat ejection is initiated when a charge of powder (not shown) in the cylinder is detonated by means of a firing mechanism designated generally by 9, and the pressure of the expanding gases of the powder charge propels the piston out of the cylinder to accelerate the seat and its occupant upwardly through a suitable opening in the aircraft.

The upper portion of the seat comprises a headrest 10 which supportingly engages the airman's head during normal flight and ejecting escape. At the top of the headrest the seat is provided with means defining a forwardly opening chamber 11 which provides a housing for the face screen 12 of this invention when the same is in its inoperative position during normal flight.

Unlike the face shields or blinds heretofore used with ejection seats, which were substantially imperforate and were intended to serve as wind screens, the face screen of the present invention is net-like, comprising lengthwise extending filaments or strings 13 and transversely extending filaments or strings 14, forming reticulations with open spaces between them through which the air may flow substantially freely. When the face screen is pulled down to its operative position in front of the face of the seat occupant, it gives protection to him by reason of the fact that it supports his head and holds his oxygen mask 15 and visor 16 in place on his face. It is, of course, desirable that the airman have his oxygen mask in event of a high altitude ejection, but it is also noteworthy that the oxygen mask, like the visor, when securely held in place, as by the screen of this invention, affords the airman substantial protection against the wind stream that strikes him as he leaves the airplane. Because the face screen of this invention is net-like, so that air can flow through it readily, it is not likely to be torn off by the rush of air as the airman leaves the aircraft, and thus assurance is had that it will continue to hold the airman's personal equipment (visor and oxygen mask) in place.

Figure 1:
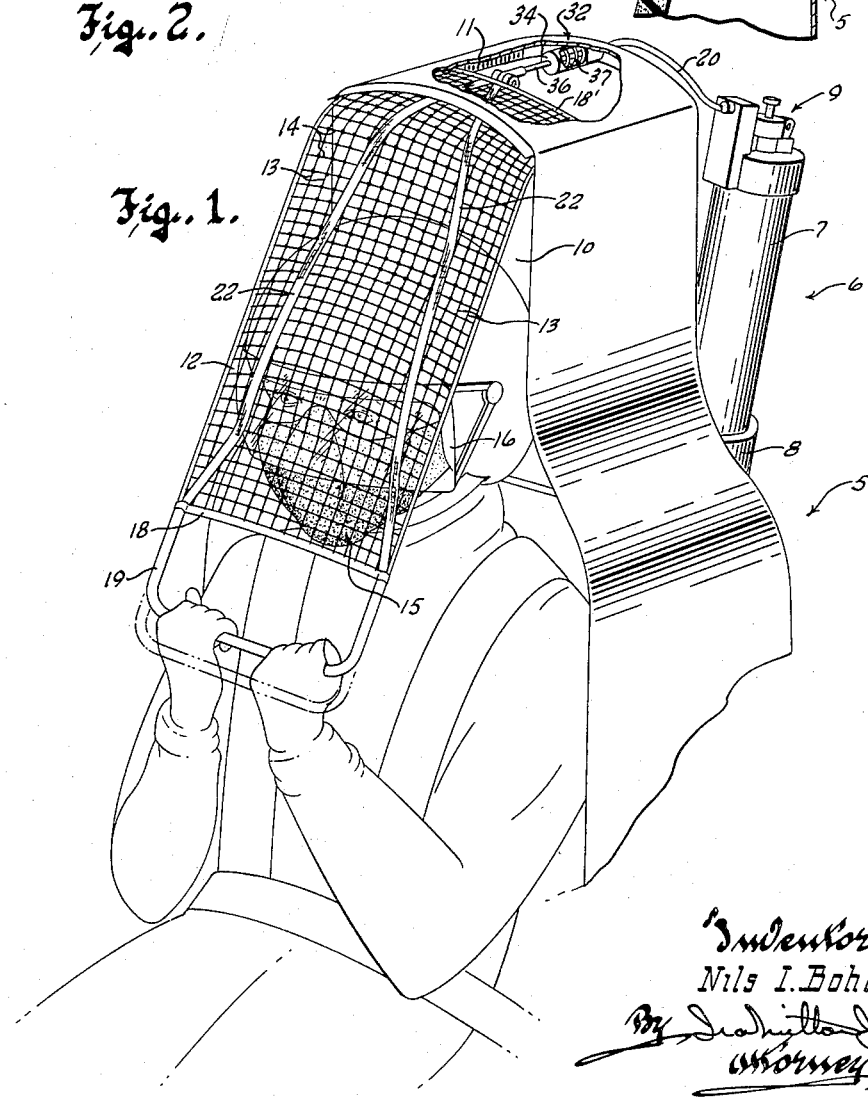
Figure 1 is a perspective view of the upper portion of an ejection seat incorporating the face screen of this invention which is shown in its operative position.

Preferably the screen has substantially rigid transverse rods 18 and 18' at its bottom and top, by which it is held spread out in a position to be fully effective, as shown in Figure 1, and which rods also transmit tension from a handle 19 at the bottom of the screen to a Bowden wire 20 or the like connected with the detonating mechanism. To reinforce the screen and to insure better transmission of tension from the handle to the detonator actuating Bowden wire 20, a plurality of reinforcing bands 22 of tape or the like may be connected between the rods 18 and 18'.

The network comprising the screen may have its filaments connected in any desired manner to form reticulations, but they should be spaced far enough apart to avoid flutter due to high speed air flow across them. Preferably at least the lengthwise extending filaments of the screen are of resilient material such as nylon so that the handle 19 can yieldingly move downwardly with the airman's hands and arms to absorb the shock upon them from downward inertia forces due to upward acceleration of his body during seat ejection.

Other means may also be provided to render the handle downwardly yieldable, either in lieu of making the lengthwise extending filaments of elastically stretchable material or in addition thereto. The handle, for example, may have a resiliently shock absorbing connection to the lower transverse rod 18, as shown in Figure 2. In this case the handle comprises a U-shaped member having tubular legs 26, each of which has a helical compression spring 27 therein. Secured to the lower transverse rod 18 are tension rods 29 which extend axially into the hollow legs of the handle, through stops 30 which close the outer ends of the legs. Each tension rod has a collar 31 anchored to its inner end, and one of the compression springs 27 is confined between this collar and the stop 30, surrounding the tension rod.

Figure 3:
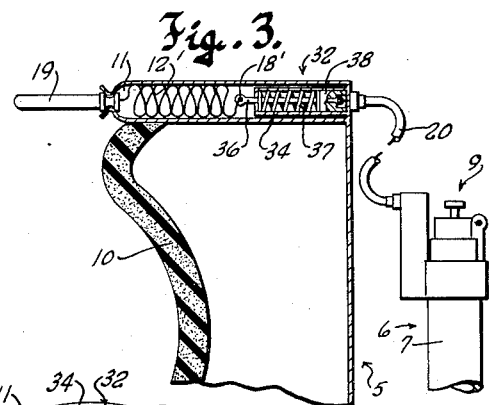
Figure 3 is a vertical sectional view through the upper portion of the seat with the face screen shown in its inoperative position.

In addition to, or in lieu of, the yielding means described above, yielding downward displacement of the handle may be provided for by means of a yielding connection 32 between the upper transverse rod 18' and a fixed part on the upper portion of the seat. As shown in Figures 1 and 3, a cylinder 34 is fixed to the rear wall of the forwardly opening chamber 11 in which the screen is normally housed, and said cylinder projects forwardly into the chamber. A plunger stem 36 extends axially through the cylinder and forwardly out of the same, and the upper transverse rod 18' is secured to the front end of this plunger stem. A coiled compression spring 37 surrounds the plunger stem and is confined between a collar 38 at the rear of the plunger and the front wall 39 of the cylinder to provide for downward shock absorbing displacement of the entire screen and thus of the handle at its bottom. The Bowden wire 20 has one end connected to the inner end of the plunger stem and has its other end connected with the detonator mechanism, so that as the screen is fully withdrawn from the housing, and then further tensioned, detonator actuating tension is applied to the Bowden wire.

From the foregoing description, taken together with the accompanying drawing, it will be apparent that this invention provides a face screen for the occupant of an ejection seat whereby his personal equipment such as a visor and oxygen mask will be held in place on his face, to protect him from the force of the wind upon ejection from an aircraft in which the seat is mounted, and it will be further apparent that the screen of this invention is not likely to be blown away by the force of the wind stream because of its reticulated construction. It will also be apparent that the handle on the face screen of this invention is not likely to be torn out of the airman's grasp during ejecting acceleration because of its resilient connection with the fixed part of the seat, whereby it is permitted to have yielding downward displacement.

What is claimed as my invention is:

1. In an aircraft ejection seat of the type adapted to be propelled, with its occupant, out of an airplane in which it is mounted, a screen secured at its upper end to a fixed member on the upper portion of the seat and having a handle at its lower end by which the screen may be drawn down from a normal position above the seat occupant's head to an operative position in front of the occupant's face, said screen being characterized by: resilient means connected between the handle and said fixed member on the seat whereby the handle is yieldable downwardly to absorb the shock of inertia forces on the seat occupant's hands and arms due to his upward acceleration during seat ejection, and thus provide assurance that the occupant of the seat will not lose his grip on the handle; and further characterized by the fact that the screen is netlike, so that air can readily flow therethrough, to provide further assurance that the handle will not be jerked out of the seat occupant's hands by large air loads on the screen, said screen being adapted to securely hold the seat occupant's personal equipment in place on his face during ejection.

2. In an aircraft ejection seat, means for holding an oxygen mask in place on the face of an occupant of the seat during ejection, to afford him protection against the force of the wind stream, said means comprising: a netlike screen having reticulations defining numerous apertures through which air may flow substantially freely, so that excessive air forces against the screen cannot develop which might tend to tear it out of the occupant's grasp and away from in front of his face, one end of said screen being connected to a fixed member at the top of the seat, and the other end of the screen having a handle adapted to be held by the occupant during ejection.

3. In an aircraft ejection seat: a face screen connected at its upper end with a fixed member on the seat and adapted to occupy a retracted position at the upper portion of the seat; a handle for manually drawing the screen downwardly to an extended position in front of the seat occupant's face when ejection is initiated and by which handle the screen may be held in said operative extended position; and resiliently yieldable means connecting the handle with the bottom of the screen to render the handle downwardly yieldable relative to the screen, so that said resiliently yieldable means can absorb inertia forces on the seat occupant's hands and arms consequent to the upward acceleration of seat ejection, and thereby enable the occupant to readily maintain his grip on the handle during seat ejection.

4. In an aircraft ejection seat: a face screen secured at its upper end to a fixed member on the seat and adapted to be normally housed in the upper portion of the seat, in an inoperative position; a handle secured to the bottom of the face screen by which it may be manually drawn downwardly in front of the seat occupant's face when ejection is initiated and by which handle the face screen may be held in an operative position in front of the occupant's face; and yieldable means connected between the upper portion of the seat and said handle to render the handle downwardly yieldable relative to the upper portion of the seat, so that the handle can absorb inertia forces on the seat occupant's hands and arms consequent to the upward acceleration of seat ejection, to enable the occupant to readily maintain his grip on the handle during ejection, said face screen comprising reticulations of resilient material whereby downward yieldability of the handle is provided for and whereby the screen is provided with numerous apertures through which air may flow freely, to prevent the screen from being torn away from in front of the seat occupant's face by the air stream as he leaves an aircraft, and thus provide assurance that the screen will hold his personal equipment in place on his face.

References Cited in the file of this patent

UNITED STATES PATENTS

| 2,457,252 | Martin | Dec. 28, 1948 |
| 2,475,588 | Bierman | July 12, 1949 |
| 2,597,764 | Tucker et al. | May 20, 1954 |
| 2,708,083 | Martin | May 10, 1955 |
| 2,726,054 | Lesley et al. | Dec. 6, 1955 |
| 2,829,850 | Culver | Apr. 8, 1958 |

FOREIGN PATENTS

| 624,143 | Great Britain | May 27, 1949 |
| 530,391 | Canada | Sept. 18, 1956 |